March 26, 1929.   G. R. SMITH   1,707,030
TEMPERATURE INDICATOR FOR INTERNAL COMBUSTION MOTORS
Filed June 20, 1928
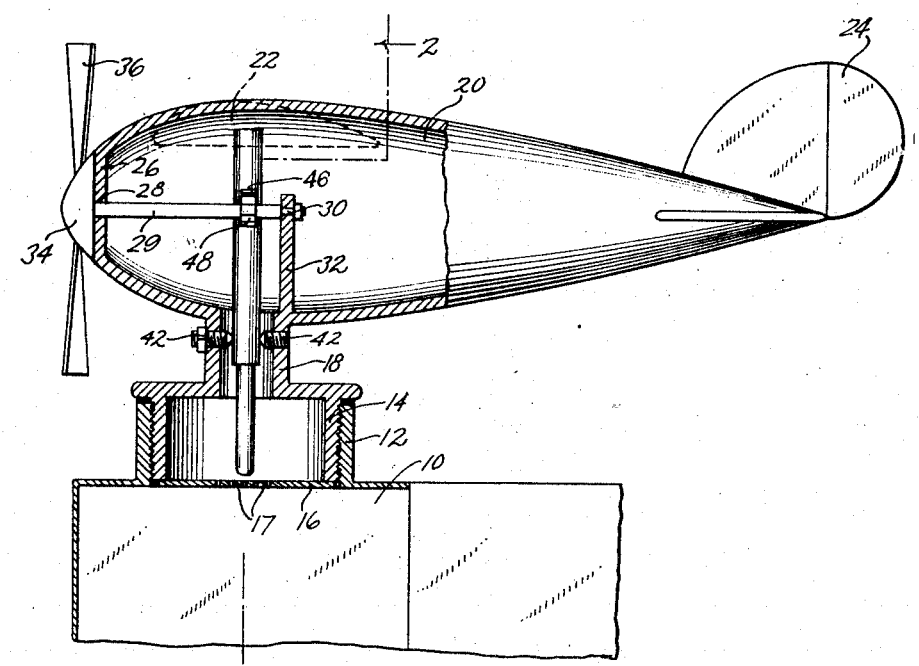
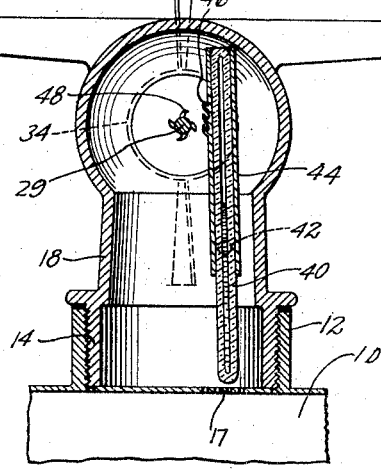
INVENTOR
GEORGE R. SMITH
BY
Newell Spencer
ATTORNEYS Patented Mar. 26, 1929.

1,707,030

UNITED STATES PATENT OFFICE.

GEORGE R. SMITH, OF PHOENIX, ARIZONA.

TEMPERATURE INDICATOR FOR INTERNAL-COMBUSTION MOTORS.

Application filed June 20, 1928. Serial No. 286,724.

The present invention relates to new and useful improvements in temperature indicators for internal combustion motors, and it pertains more particularly to such devices as are employed to indicate the temperature of the motors of motor vehicles.

It is one of the objects of the invention to provide a device of the above-mentioned character which, in addition to operating as a warning that the motor of a motor vehicle has attained a high temperature, serves as an ornament for the radiator of the vehicle.

It is a further object of the invention to provide a temperature indicator preferably in the form of a movable visual signal, the movement of which is continuous so long as the operating conditions of the motor remain normal, but which movement is arrested upon the existence of abnormal operating conditions which are due to overheating of the motor.

Other objects of the invention relate to certain novel constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings:

Figure 1 is a view partly in section and partly in elevation of a temperature indicator for the motor of motor vehicles constructed in accordance with the present invention; and Figure 2 is a vertical sectional view thereof taken on the line 2—2 of Figure 1.

In referring to the drawings the reference numeral 10 designates the radiator of a motor vehicle which, however, is of no particular type, it being understood that the device of the present invention is capable of use with any type of motor vehicle radiator having a filling opening provided with a suitable closure.

The radiator 10 is provided with the usual filling spout 12 and said filling spout 12 is closed by a cap 14.

In the present instance, the cap 14 is provided with a bottom wall 16 which in turn is perforated as at 17 for a purpose to be hereinafter described. Projecting from the top wall of the radiator cap 14 there is a contracted neck portion 18 and carried by this neck portion 18 there is an elongated member 20. This member 20 is preferably an imitation of the body or fuselage of a flying machine, and it is provided with the various elements of a flying machine such, for example, as the planes 22, rudder 24, etc.

The member 20 is hollow and at its forward end has a flattened portion 26 and said flattened portion is formed with a bearing 28 in which is mounted the forward end of the shaft 29, the rear end 30 of this shaft being mounted in a bearing carried by a suitable standard or the like 32. The forward extremity of the shaft 29 is provided with an enlargement or head 34 and carried by this head 34 is the propeller 36, and the inner end of the shaft 29 is provided with a nut 30' which serves to prevent displacement of the shaft in its bearings 28 and 30.

From the foregoing it will be apparent that due to the draft created by the movement of the vehicle the propeller 36 will be rotated, since the shaft 29 is freely mounted in its bearings. Means is provided, however, to operate under certain conditions to arrest the rotary movement of the propeller 36 and this means preferably comprises a thermometer or the like 40.

This thermometer is mounted in anti-friction bearings 42 in the neck 18 of the cap and occupies a substantially vertical position with its lower end positioned directly over the perforations 17 in the bottom wall 16 of the cap. Surrounding the upper portion of the thermometer 40 there is a metal cap 44 and said metal cap is provided with a plurality of curved teeth 46 formed on that portion adjacent the shaft 29, it being understood that the upper end of the thermometer and the metal cap 44 extend to a point above the shaft 29. The shaft 29 carries a gear wheel 48 which is so positioned on said shaft as to be opposite the teeth 46, so that movement of the thermometer 40 about its pivotal points provided by the anti-friction bearings 42 will cause the teeth 46 of the metal casing 44 to interengage with the teeth of the gear 48 and lock the shaft 29 against movement, thus arresting movement of the propeller 36.

By reference to Figure 2 it will be noted that the thermometer 40 occupies a position over the perforations 17 and slightly inclined towards the shaft 29, and it is prevented from moving to the vertical position by reason of the engagement of the upper end of the metal casing 44 with the upper wall of the member 20, as shown in Figure 2. The proportions of the thermometer and its metal casing 44 are such that as the temperature of the cooling medium in the radiator 10 of the vehicle rises to a point sufficient to force the mercury column of the thermometer upwardly, the upper end of the thermometer will be overbalanced. This overbalancing of the upper end of the thermometer 40 causes the same to move about its pivotal points to a position where the teeth 46 engage the gear 48, thus arresting rotary movement of the propeller 36. It will be understood that the movement of the upper end of the thermometer 40 in the direction of the shaft 29 is due to the fact that as heretofore stated, the thermometer is slightly inclined towards the shaft 29 and the overbalancing of the upper end thereof thus causes the said upper end to move in the direction of the shaft 29.

From the foregoing it is apparent that the present invention provides a visible signal in the form of a rotating member 36 which continuously operates so long as the temperature of the motor remains normal but which operation is arrested immediately upon abnormal temperature conditions existing in the motor.

It is to be understood that the invention is not limited to the particular construction and arrangement of parts of the illustrated embodiment thereof, but that the invention may be embodied in other forms within the scope of the claims.

Having explained the nature and objects of the invention and having specifically described the construction embodying the invention in its preferred form, what is claimed is:

1. A temperature indicator for internal combustion motors comprising a movable visual signal operable while the motor is running at normal temperature, and temperature controlled gravity operated means for arresting the movement of said visual signal upon an abnormal rise of temperature during operation of the motor.

2. A temperature indicator for internal combustion motors comprising a rotating visual signal operable while the motor is running at normal temperature, and temperature controlled gravity operated means adapted upon abnormal temperature conditions to engage the rotating visual signal and arrest the movement thereof.

3. A temperature indicator for internal combustion motors comprising a rotating visual signal, a rotating shaft upon which said signal is carried, a gear carried by said shaft, and means for interengagement with said gear to arrest the rotary movement of said shaft and the visual signal carried thereby.

4. A temperature indicator for internal combustion motors comprising a rotating visual signal, a rotating shaft upon which said signal is carried, a gear carried by said shaft, and means for engaging said gear to arrest the rotary movement of said shaft and the visual signal carried thereby, said last mentioned means being temperature-controlled.

5. A temperature indicator for internal combustion motors comprising a rotating visual signal, a rotating shaft upon which said signal is carried, a gear carried by said shaft, and means for engaging said gear to arrest the rotary movement of said shaft and the visual signal carried thereby, said last-mentioned means comprising a pivotally mounted thermometer.

6. A temperature indicator for internal combustion motors comprising a rotating visual signal, a rotating shaft upon which said signal is carried, a gear carried by said shaft, means for engaging said gear to arrest the rotary movement of said shaft and the visual signal carried thereby, said last mentioned means comprising a pivotally mounted thermometer, a metal casing surrounding a portion of said thermometer, and a plurality of teeth carried by the metal casing of the thermometer and adapted for engagement with said gear.

Signed at Phoenix, Arizona, this 7 day of June, 1928.

GEORGE R. SMITH.